United States Patent [19]

Bocelli et al.

[11] Patent Number: 4,540,425

[45] Date of Patent: Sep. 10, 1985

[54] APPARATUS FOR BENDING AND TEMPERING OF THERMOPLASTIC SHEETS OF DIFFERENT CURVATURES

[75] Inventors: Aureliano Bocelli, Leghorn; Carlo Colombini, San Prospero, both of Italy

[73] Assignee: Saint-Gobain Vitrage, Courbevoie, France

[21] Appl. No.: 632,807

[22] Filed: Jul. 20, 1984

[30] Foreign Application Priority Data

Jul. 20, 1983 [FR] France .................. 83 11954

[51] Int. Cl.³ .................................... C03B 23/033
[52] U.S. Cl. .................................... 65/273; 65/107; 65/287
[58] Field of Search .............. 65/108, 114, 118, 119, 65/349, 350, 351, 106, 107, 287, 273

[56] References Cited

U.S. PATENT DOCUMENTS

| | | | |
|---|---|---|---|
| 3,799,752 | 3/1974 | Cheron | 65/351 |
| 3,801,298 | 4/1974 | Bezombes | 65/104 |
| 3,831,239 | 8/1974 | Hoff et al. | 65/106 X |
| 4,054,437 | 10/1977 | Uerberwolf et al. | 65/107 |
| 4,054,438 | 10/1977 | Presta | 65/107 |
| 4,123,246 | 10/1978 | Johnson | 65/104 |
| 4,139,359 | 2/1979 | Johnson et al. | 65/107 |
| 4,203,754 | 5/1980 | Potier | 65/273 |
| 4,292,065 | 9/1981 | Nedelec et al. | 65/104 |

FOREIGN PATENT DOCUMENTS

| | | | |
|---|---|---|---|
| Ad.22051 | 5/1921 | France | 65/287 |
| 1476785 | 3/1967 | France . | |
| 2129919 | 11/1972 | France . | |
| 2442219 | 6/1980 | France . | |
| 2492361 | 4/1982 | France . | |

Primary Examiner—Arthur Kellogg
Attorney, Agent, or Firm—Pennie & Edmonds

[57] ABSTRACT

The rollers or curved rods and other elements supporting the glass sheets as well as the apparatus necessary for bending and/or tempering are preferably mounted on a pair of longitudinally flexible strips that rest on a pair of rigid templates having the desired curvature. Each flexible strip advantageously is a chain whose links are hinged on one another, these links being provided with flanges to which are fastened the rollers or curved rods, all other elements for supporting the glass sheets, and the elements necessary for bending and tempering. To permit modification of the curved profile, the templates are removable and interchangeable. To facilitate changing of the templates, the apparatus is equipped with a system for lifting the strips or chains. Such lifting system comprises one or more pivoting beams that are lifted by drive means such as a jack and a bent connecting rod. When the beams are raised, they lift the strip or chain off the template, thereby freeing the template to be replaced with a template having a different curvature.

15 Claims, 8 Drawing Figures

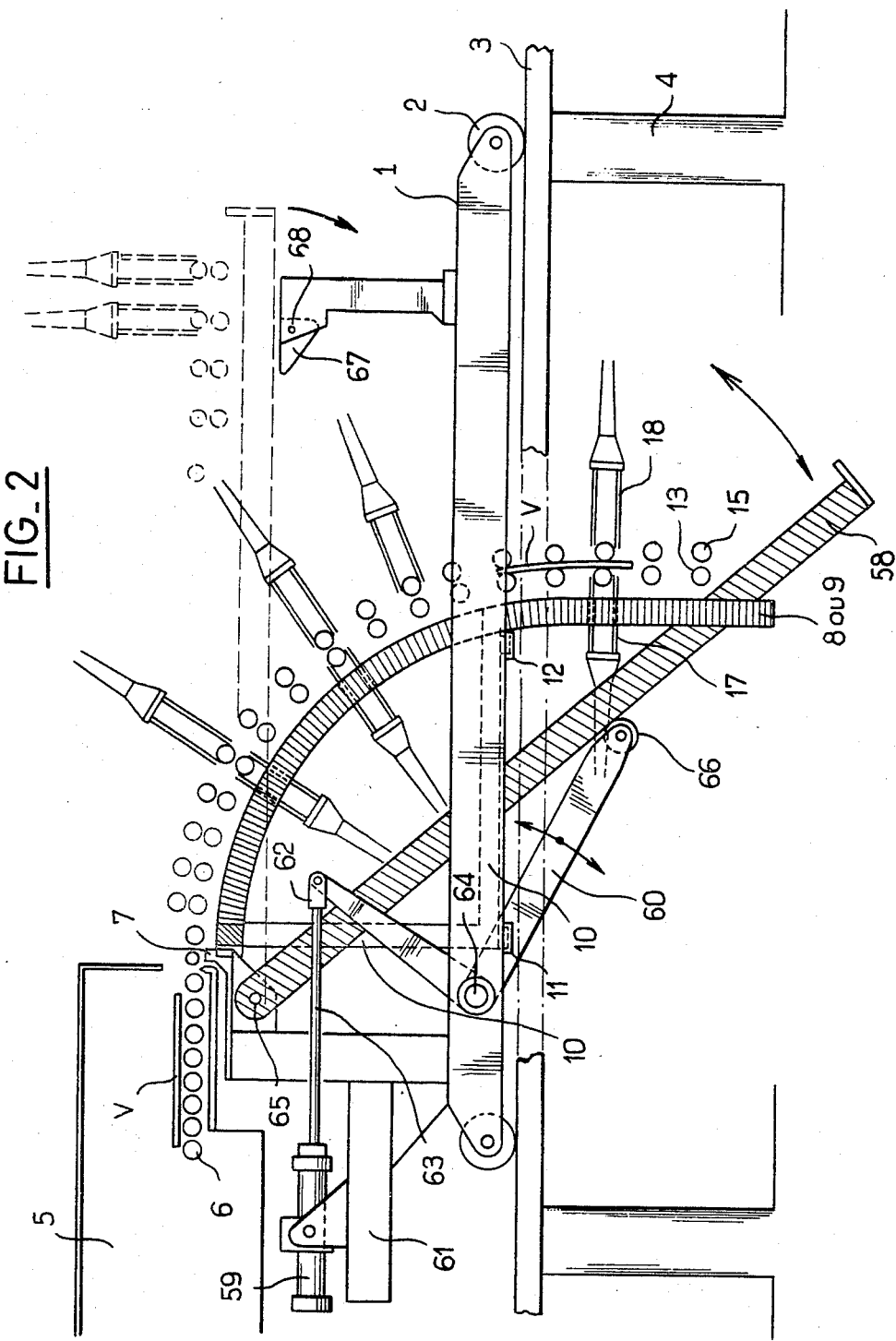

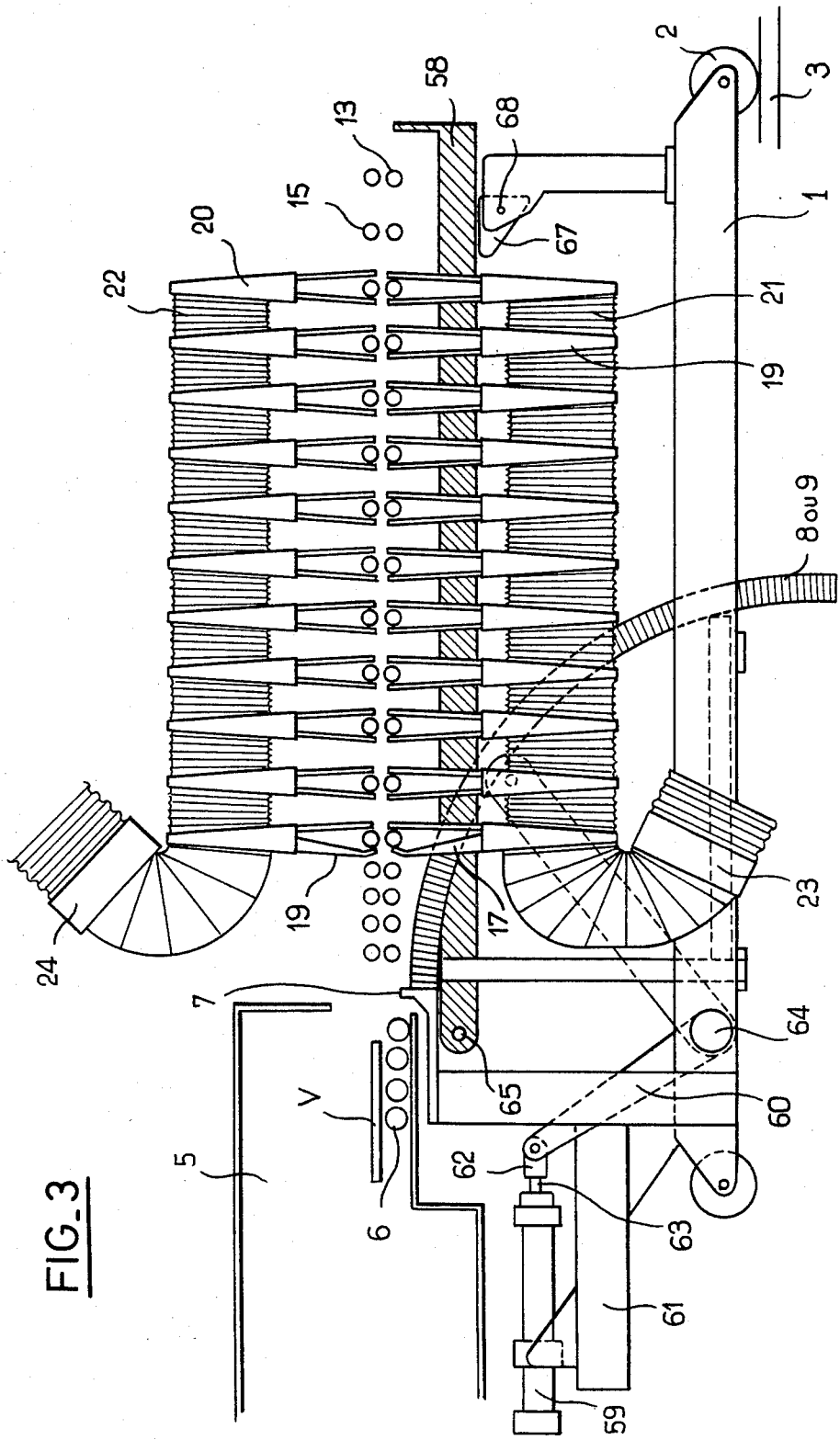
FIG_3

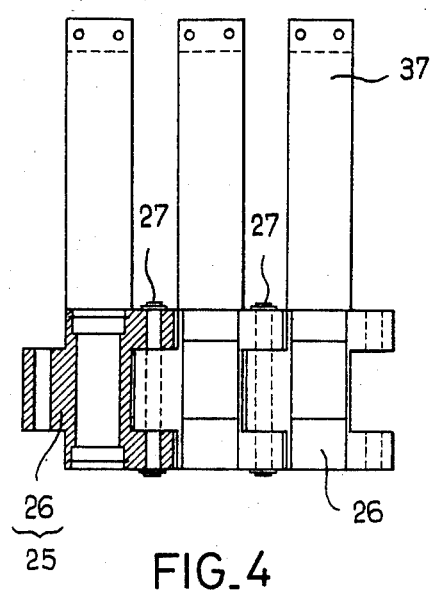
FIG_4
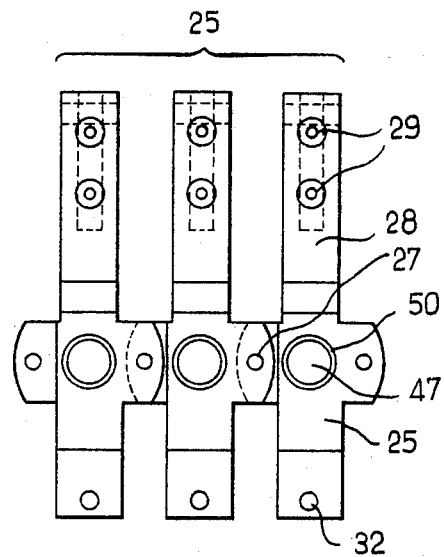
FIG_5
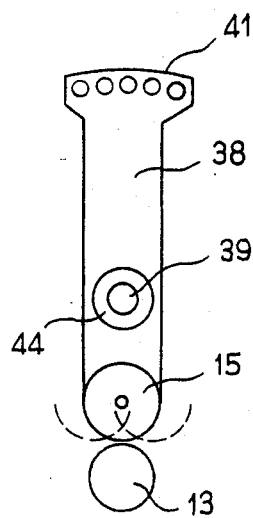
FIG_7
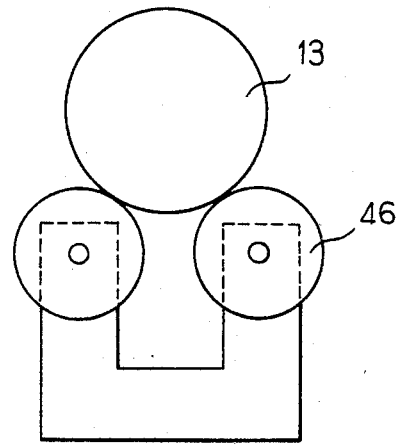
FIG_8

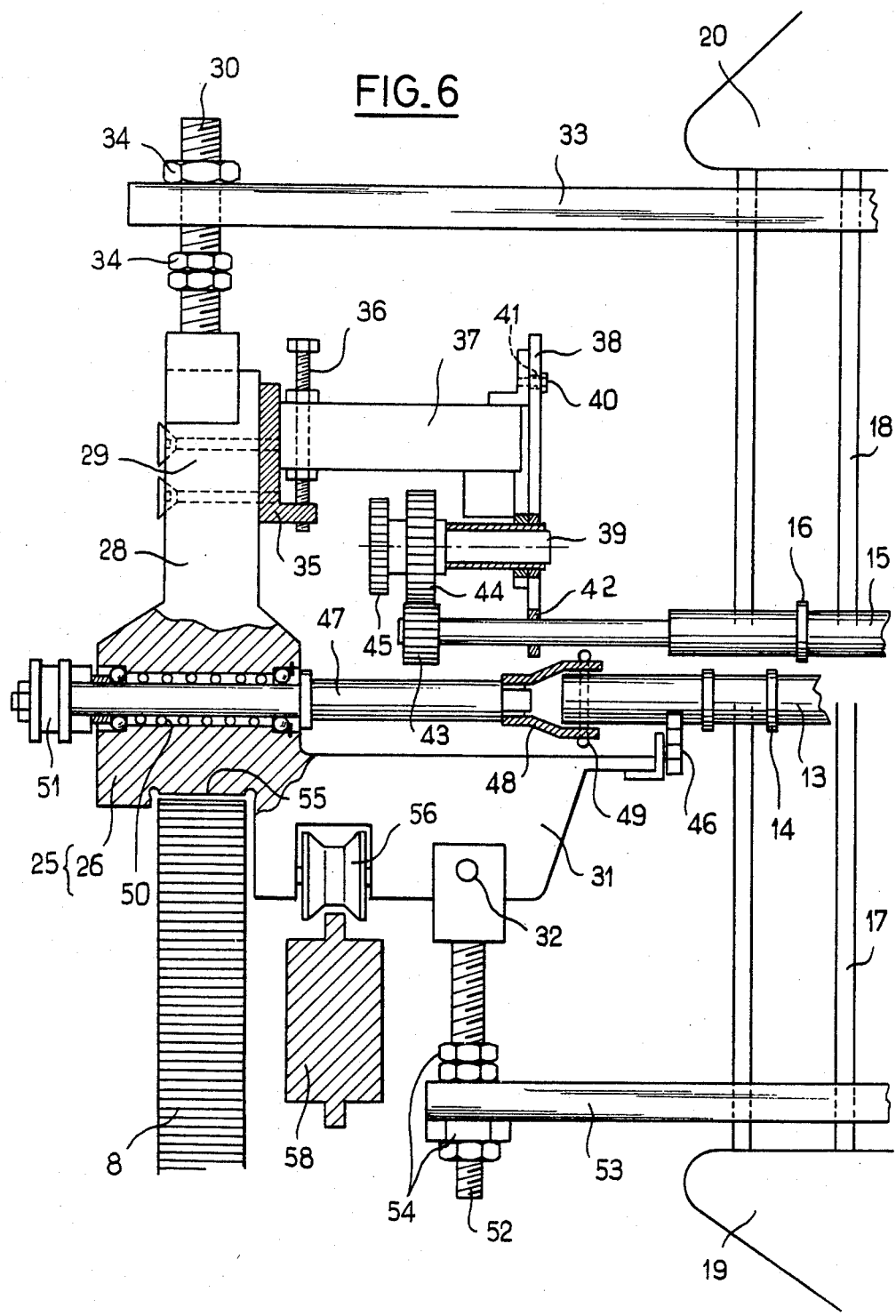

APPARATUS FOR BENDING AND TEMPERING OF THERMOPLASTIC SHEETS OF DIFFERENT CURVATURES

BACKGROUND OF THE INVENTION

This invention relates to the bending and tempering of thermoplastic sheets such as glass plates that pass through a shaping bed made up of straight rollers or curved rods placed along a curved profile and it relates particularly to an installation whose curved profile can easily be adjusted and modified.

French patent publication No. 2,442,219 describes the bending and tempering of glass sheets while they advance through a shaping bed comprising straight rollers or curved rods mounted in a curved profile. The glass sheets, which previously have been heated to their softening temperature, gradually take the shape of the shaping bed on which they advance. They acquire a simple curve in the lengthwise direction of their advance if the shaping bed is made of straight rollers. If, however, the bed is made of curved rods tilted by pivoting around the shaft that goes through their ends, as disclosed in U.S. Pat. No. 4,292,065 which is incorporated herein by reference, the sheets acquire a double curve. In addition to the lengthwise curve caused by the lengthwise curved profile of the shaping bed, the sheets also acquire a crosswise curve due to the shape and tilt of the curved rods.

As taught in French patent publication FR No. 476 785, the bearings of the rollers or curved rods and all the other elements such as upper holding rollers, counterrods and blowing nozzles in the tempering zone are advantageously mounted on spring blades whose curvature can be adjusted by tension rods connected to the ends of the blades. With this system, however, it can be difficult to obtain a uniform and reproducible curve since the loads supported by these blades can alter the elasticity and modify the curvature of the blades locally and since the unit can vibrate, especially because of the air blowing from the blowing nozzles during tempering.

SUMMARY OF THE INVENTION

The present invention is directed to a different design of tempering installation which eliminates the drawbacks of previous designs and provides a shaping bed with a curved profile that is perfectly correct, uniform and stable, leading to better quality glasses.

In accordance with the invention, the rollers or curved rods and other elements supporting the glass plates as well as the other apparatus necessary for bending and/or tempering are preferably mounted on a pair of longitudinally flexible strips that rest on a pair of rigid templates having the desired curvature.

Each flexible strip advantageously is a chain whose links are hinged on one another, these links being provided with flanges to which are fastened the rollers or curved rods, all other elements for supporting the glass sheets, and the elements necessary for bending and tempering.

To permit modification of the curved profile, the templates are removable and interchangeable. To facilitate changing of the templates, the apparatus is equipped with a system for lifting the strips or chains. Such lifting system comprises one or more pivoting beams that are lifted by drive means such as a jack and a bent connecting rod. When the beams are raised, they lift the strip or chain off the template, thereby freeing the template to be replaced with a template having a different curvature.

BRIEF DESCRIPTION OF THE DRAWINGS

These and other objects, features and advantages of our invention will be more readily apparent from the following description of the preferred embodiment in which:

FIG. 2 is a diagrammatic side view of essential elements of the apparatus of FIG. 1;

FIG. 3 is a diagrammatic side view of the apparatus of FIG. 1 showing the blowing nozzles in raised position;

FIG. 4 is a diagrammatic top view of links of a chain intended to carry the elements for supporting the glass sheets;

FIG. 5 is a diagrammatic side view of the links of FIG. 4;

FIG. 6 is a section showing a detail of supporting rollers, counterrollers and blowing equipment on a link;

FIG. 7 is a detailed view of a pivoting plate allowing adjustment of the position of the counterrollers; and FIG. 8 is a detail of the assembly of the rollers.

DETAILED DESCRIPTION OF THE PREFERRED EMBODIMENT

Figure 1:
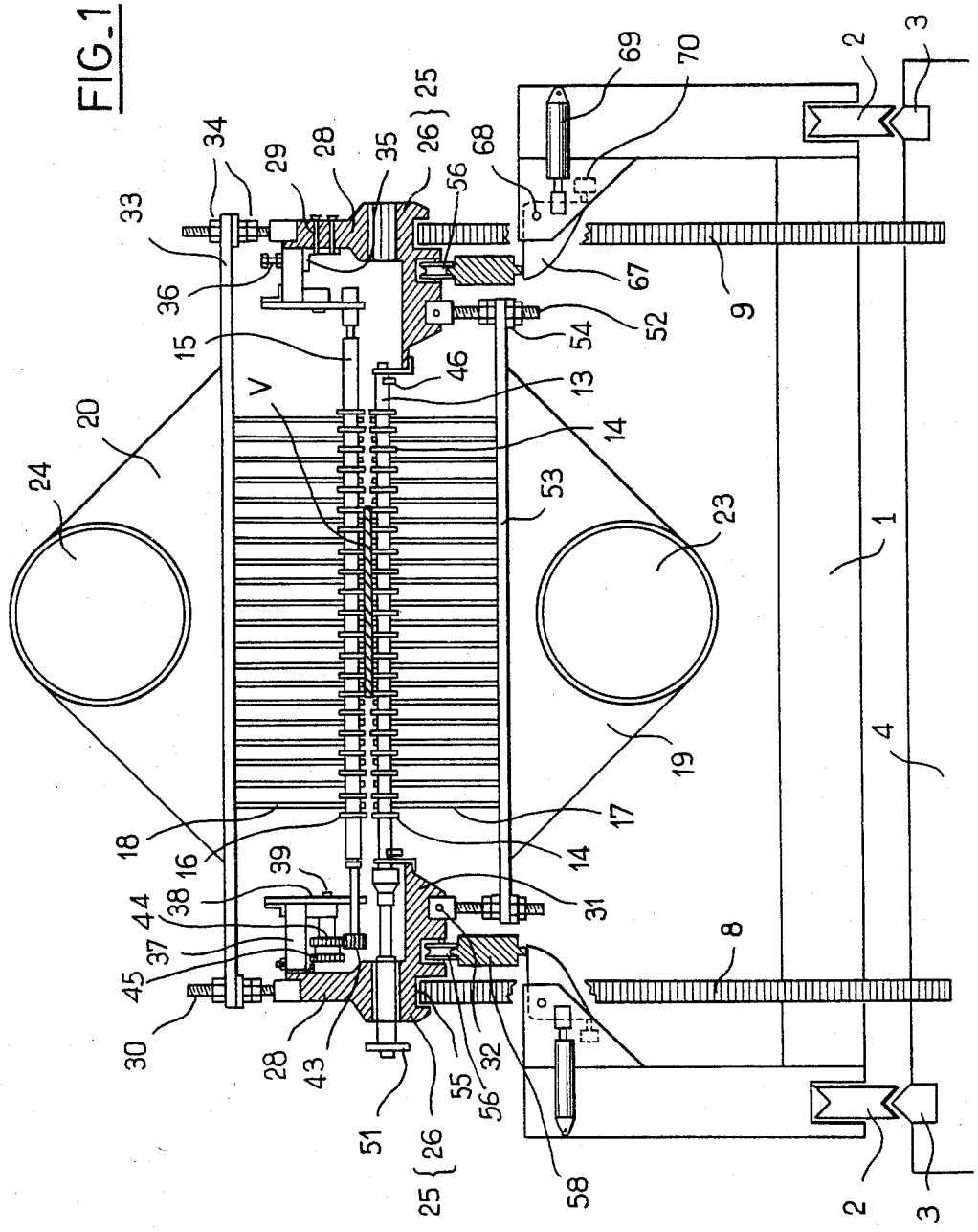
FIG. 1 is a diagrammatic front view of the apparatus of the present invention.

For convenience, the invention will be described in terms of a glass bending apparatus, but it will be understood that the invention may be practiced in bending other types of thermoplastic sheets as well.

As shown in FIGS. 1, 2 and 3, the apparatus of the present invention comprises a carriage 1 on wheels 2, which can be moved on rails 3 mounted in a general frame 4 of a glass production line. Carriage 1 supports a complete bending station, or a complete bending and tempering station, and is able to slide to the end of a heating furnace 5 (FIGS. 2 and 3) to receive glass plates V which go through furnace 5 on a roller conveyor 6. Carriage 1 has a stop 7 which rests on the front face of furnace 5 when the carriage is perfectly in place.

The carriage preferably bears two templates 8 and 9 that are mounted on either side of the path along which pass glass plates V from furnace 5. The templates are made rigid by a frame 10 (FIG. 2) that is mounted in notches 11 and 12 of carriage 1 so that the templates can easily be removed. As shown, templates 8 and 9 are upwardly convex, but they could also be concave; and their curvature is such as to impart to glass plates the desired longitudinal curvature. The apparatus of the present invention could also function with a single template, or with more than two templates. However, for purposes of size, stability and rigidity, as well as ease of modification of the curvature of the shaping bed, the choice of two templates is advantageous.

Templates 8 and 9 carry all the elements for supporting and holding and moving glass plates V as well as any equipment that might be used to provide a tempering station. In addition to the templates, the carriage also bears apparatus for lifting the supporting and holding means as well as any blowing equipment off the templates 8 and 9 so as to permit their easy replacement.

As shown in the embodiment of FIG. 1, the support elements are straight rollers 13, optionally surrounded by rings 14 on which glass plates V bear; the holding means are straight counterrollers 15 like rollers 13 with which they are associated, optionally surrounded by rings 16; and the blowing equipment comprises lower nozzles 17 and upper nozzles 18 which act on the lower surface and upper surface, respectively, of glass plates V. Nozzles 17 and 18 are fed by blowing boxes 19, 20, connected together by accordion ducts 21, 22 (FIG. 3) and fed through a flexible connection 23, 24 from an intake pipe of compressed gas, generally air (not shown). When lower nozzles 17 are provided, their distal ends are advantageously close to the upper generatrix of lower rollers 13 or rings 14; and when upper nozzles 18 are provided, their distal ends are close to the lower generatrix of counterrollers 15 or rings 16.

All these support elements, these holding means, and blowing equipment are fastened to two vertically deformable strips that are mounted on templates 8 and 9 and fastened to the front of carriage 1, for example, at stop 7. The height at which these strips are fastened to stop 7 is such that the support elements mounted on the strips are at the same level as rollers 6 of the upstream conveyor.

Illustratively, each of these deformable strips is a chain 25 having links 26, shown in top view in FIG. 4 and in side view in FIG. 5, that are hinged on one another around horizontal pins 27. As shown in FIGS. 1, 5 and 6, each link 26 extends vertically upward in the form of a plate 28 pierced with bores 29 and surmounted by a threaded vertical rod 30. Each link also extends vertically downward in the form of a protrusion 31 pierced with a bore 32 in which is mounted a threaded vertical rod 52.

Corresponding links 26 belonging to the two parallel chains 25 are connected by beams 33 (FIGS. 1 and 6) whose pierced ends are engaged on threaded rods 30 and by beams 53 whose pierced ends are engaged on threaded rods 52. Beams 33 extend through the installation, perpendicular to the direction of advance of glass plates V and support the upper blowing equipment, namely, boxes 20, deformable ducts 22 which connect them, the flexible connections 24 and nozzles 18 directed toward the upper surface of glass plates V to be tempered. Groups of nuts 34 make it possible to adjust the height of beams 33 on rods 30 and to lock them, thereby adjusting the height of nozzles 18 with respect to the upper surface of glass sheets V.

Beams 53, which likewise extend perpendicular to the direction of advance of the glass sheets, support the lower blowing equipment, namely, boxes 19, deformable ducts 21 which connect them, flexible connections 23 and nozzles 17 directed toward the lower surface of glass plates V to be tempered. Groups of nuts 54 make it possible to adjust the height of beams 53 on rods 52 and to lock them, thereby adjusting the distance of nozzles 17 from the lower surface of glass sheets V.

Bores 29 (FIG. 6) mount brackets 35 on plates 28 of links 26. A system 36 of screws and nuts fastens horizontal flanges 37 to these brackets at an adjustable height. Each horizontal flange 37 bears a plate 38 that is mounted to pivot around a swivel pin 39 and supports at its lower end bearings 42 in which a counterroller 15 can rotate. The two ends of each counterroller 15 are mounted to turn in bearings 42 of two opposed plates 38 fastened on two corresponding links 26 belonging to the two parallel chains 25. At least one of the ends of each counterroller 15 carries a pinion 43 which meshes with a drive pinion 44 that is mounted to turn on an extension of swivel pin 39 and is connected to a grooved pulley or drive pulley 45. Pulleys 45 are connected by a belt or a chain (not shown) which passes over a drive shaft (also not shown).

As shown in detail in FIG. 7, plate 38 is mounted to pivot around swivel pin 39 so as to alter the position of counterroller 15. After choice of one of several possible orientations, plate 38 can be locked by a screw 40 that is screwed into flange 37 through one of holes 41 in plate 38. In the embodiment described and shown in the figures, five holes 41 are provided, allowing a choice between five different orientations of the plates 38.

Protrusions 31 carry pairs of rollers 46, shown edge on in FIG. 6 and in detail in FIG. 8, which are free to rotate and form a cradle to support rollers 13. The two ends of each roller 13 thus rest on pairs of rollers 46 mounted on opposed protrusions 31 fastened on two corresponding links 26, each belonging to one of the two parallel chains 25. Rollers 13 are connected on at least one of their ends to a shaft 47 by a sleeve 48 that is locked on said end by an annular spring 49. Shaft 47 goes through link 26 of chain 25 and turns in a bearing 50 incorporated in said link 26. On the other side of link 26, the end of shaft 47 carries a pinion 51 that meshes with a chain (not shown) which also meshes with other pinions 51 of other shafts 47 coupled to other rollers 13, and to a drive pinion moved by a motor (not shown). The drive means connected to rollers 13 and counterrollers 15 move the glass sheets through the shaping bed.

While the apparatus for bending and tempering glass sheets has been described in terms of a bed of straight rollers placed along a curved profile having an upward convexity, the straight rollers could be replaced by other elements for supporting the glass sheets during their travel. For example, curved rods surrounded by a rotating tubular sheath, rollers, blowing pins making it possible to support the glass sheets on a gas cushion, etc., can be used without altering the invention. In this case, the straight counterrollers 15 will be replaced by holding means suited to the nature and shape of the support elements with which they are associated. Thus, when the support elements are curved rods surrounded by rotating tubular sheaths, as known particularly from French patent publication No. 2 442 219 already cited, the upper holding means can be counterrods that are also curved and surrounded by tubular sheaths, as described in French patent publications Nos. 1 476 785, 2 129 919.

When the supporting elements and holding elements are not straight rollers or counterrollers but rather curved rods and curved counterrods, each surrounded by rotating tubular sheaths, the pivoting mechanisms of rods and counterrods that make it possible to modify the crosswise curve of the shaping bed are also carried by links 26. The assembly of said rods and counterrods differs slightly from the assembly described for straight rollers and counterrollers particularly in the cradle system for rollers 46 and the system of driving with sleeve 48. However, in view of the foregoing description, such adaptations are within the scope of a person skilled in the art.

Each link 26 has, on its lower side, a shoulder 55 that forms the seat by which the link rests on template 8 or 9. Each link also has on its lower side a setback in which is fastened a freely rotating roller 56. Roller 56 is mounted opposite a rail 57 carried by a lengthwise beam 58 and engages this rail when beam 58 is lifted to change templates 8 and 9.

The apparatus for lifting chains 25 to disengage templates 8 and 9 is best shown in FIG. 2. The apparatus comprises a pair of pivoting beams 58, located underneath rollers 56 of links 26, a jack 59, and bent connecting rods 60 that transmit the movement of the jack to beams 58. Beams 58 are mounted to pivot around swivel points 65 on carriage 1. Jack 59 is mounted on a platform 61 on carriage 1 that is low enough to be inserted under furnace 5 or is offset laterally to one of its sides. A head 62 of a stem 63 of jack 59 is connected to at least a head of bent connecting rod 60 that is hinged on carriage 1 around a pivot 64. Each connecting rod 60 ends in a roller 66 at its free end opposite the head of the connecting rod connected to head 62 of the stem of jack 59.

When the installation has two pivoting beams 58, pivoting of the two beams 58 can be obtained with only one jack 59 and only one bent connecting rod 60 acting on only one beam 58, the pivoting of this beam being transmitted to the other beam by a splined shaft (not shown) concentric with swivel pins 65 or by a rod (also not shown) joining said two beams 58. In a variant, each beam 58 can be associated with a bent connecting rod 60 with a single jack 59 acting on a rod (not shown) connecting the two heads of bent connecting rods 60. Alternatively, the jack can be coupled to the head of one connecting rod 60 and the second connecting rod 60 can be connected to the first either by a splined shaft or by an interlocking rod (not shown). In still another variant, separate jacks 59 can be provided for each connecting rod 60.

As shown in FIG. 1, carriage 1 can advantageously be equipped with flaps 67 pivoting around a shaft 68 under the action of a jack 69 so as to support beams 58 when they have been lifted and are loaded with chains 25 and all the bending and tempering equipment they carry. Advantageously, a stop 70 for locking these flaps 67 in open position is also provided.

Operation of the foregoing apparatus is as follows. First the operator determines the curvature of the shaping bed that is required to obtain the desired curvature of the sheets and selects suitable templates 8 and 9 for producing this curvature. Beams 58 are then raised by jack 59 to substantially a horizontal position as shown in FIG. 3. For safety and to relieve jack 59 of the weight of said lifting system, flaps 67 are opened and locked in open position by stops 70. The appropriate templates 8 and 9 are then inserted into notches 11 and 12 of carriage 1. Once the templates are correctly positioned, stops 70 are removed, jacks 69 close flaps 67, and the lifting system gradually returns to its rest position. Beams 58 push down on rollers 66, causing bent connecting rods 60 to turn around their pivots 64 and rollers to move along the beams while the beams pivot on swivel pins 56. As links 26 meet templates 8 and 9, they rest on them and the contact of their rollers 56 with beams 58 ceases. The various links 26 are hinged on one another and conform to the curvature of the templates until they fit them over their entire length. At the same time as links 26 conform to the curvature of the templates, rollers 13, counterrollers 15, and the blowing equipment (if provided) that are mounted on links 26 are also conformed to the curvature of the templates and are automatically oriented because of their design perpendicular to the path that glass plates V will follow between rollers 13 and counterrollers 15.

The height of upper nozzles 18 and lower nozzles 17 can be adjusted by nuts 34 on threaded rods 30 and nuts 54 on rods 52, respectively. The height of counterrollers 15 can also be adjusted to allow passage of glass plates V of different thicknesses by adjusting the height of flange 37 using system 36 of screws and nuts. The position of counterrollers 15 in relation to rollers 13 with which they are associated can also be modified by pivoting of plates 38 around pins 39. Various possible positions of a counterroller 15 in relation to a roller 13 are designated by broken lines in FIG. 7. After choice of the most favorable orientation, a screw 40 is screwed through a hole 41 to fasten plate 38.

Since the apparatus is mounted on rails, such adjustments may be performed off the production line. To return the carriage to the production line, it is moved on its rails 3 until stop 7 contacts the front face of furnace 5. Platform 61 is then housed either under furnace 5 or on the side of said furnace.

Rollers 13 and counterrollers 15 are driven in rotation by chains and standard drive means (not shown in the drawings). Glass plates V arrive on rollers 6 of the conveyer from furnace 5, engage rollers 13 and counterrollers 15, and while moving along on rollers 13 gradually take on the curved profile on which said rollers are placed. If a tempering zone is provided, the glass sheets pass between blowing nozzles 17 and 18 which blow cooling air. Bent and/or tempered glass plates V are then recovered at the output of the installation thanks to recovery means not described here, mentioned in the French patent publication No. 2 442 219 already cited.

If it is desired to change templates 8 and 9 to make glass sheets of a different curvature, rotation of rollers 13 and counterrollers 15 and the blowing of nozzles 17 and 18 are interrupted and jack 59 is activated. Bent connecting rods 60 pivot to lift beams 58 on rollers 66. As they rise, beams 58 encounter rollers 56 and lift them to disengage chains 25 from the templates. The templates may then be removed and replaced with other templates as described above.

Because the foregoing apparatus provides a shaping bed of very precise curvature, it provides excellent precision in the shape of the glass sheets produced. At the same time, it provides a convenient means for changing the curvature of the shaping bed.

As will be apparent to those skilled in the art, numerous changes may be made in the foregoing apparatus without departing from the spirit and scope of the invention. For example, the invention could also be practiced with a shaping bed having a curved profile that was upwards concave instead of convex as shown in the drawing. Moreover, rather than have each pair of corresponding links bear beams 33 and 53, a counterroller 15 and a support roller 13, only some links may carry such equipment or only part of such equipment. While the apparatus preferably mounts the support means such as rods 13, the holding means such as counterrods 15 and the blowing means on a pair of flexible strips or chains 25 supported by two templates 8, 9, other numbers of flexible strips and templates may be used provided each strip is supported by a template. Numerous other modifications will be apparent.

What is claimed is:

1. In apparatus for bending thermoplastic sheets comprising a shaping bed for supporting said sheets, said bed comprising a plurality of means for moving said sheets in a first direction through said bed and mounting means for supporting said moving means, said mounting means being positioned in said first direction along a profile of desired curvature, the improvement comprising:

a template having a curved surface;

means for interconnecting said mounting means in a flexible longitudinal strip; and means for mounting said interconnected mounting means on said template, whereby the mounting means are positioned in said first direction along the profile of desired curvature.

2. The apparatus of claim 1 wherein said strip is a chain whose various links are hinged on one another, each link being provided with flanges to which are fastened the moving means.

3. The apparatus of claim 1 wherein the template is removable, making it possible to modify the curved profile by replacing the template with a template of different curvature.

4. The apparatus of claim 1 further comprising means for lifting the interconnected mounting means off the template comprising a beam placed under said mounting means and pivoted at one end and means for lifting the other end of said beam.

5. The apparatus of claim 4 wherein at least some of the mounting means further comprise a roller positioned to engage the beam when it is raised.

6. The apparatus of claim 1 wherein the moving means are rods and counterrods or rollers and counterrollers.

7. The apparatus of claim 6 wherein the counterrods or counterrollers are mounted on plates attached to two corresponding mounting means, each belonging to a different flexible strip, said plates being mounted to pivot around a fastening point, thus making it possible to adjust the position of the counterrods or counterrollers in relation to the roller or rod with which they are associated.

8. The apparatus of claim 1 further comprising blowing means for tempering the sheets, said blowing means being mounted on said mounting means.

9. The apparatus of claim 8 wherein the blowing means comprises blowing nozzles connected to boxes that are connected together by accordion ducts, said boxes and said ducts also being carried by said mounting means.

10. The apparatus of claim 1 wherein the profile of desired curvature is upwardly convex.

11. The apparatus of claim 1 further comprising a second template having a curved surface wherein each moving means is a rotating element having two ends, each of which is mounted in a mounting means so that the rotating elements are parallel to one another, the interconnecting means comprises two flexible longitudinal strips one of which interconnects the mounting means that mount one end of the rotating elements and the other of which interconnects the mounting means that mount the other end of the rotating elements and the interconnected mounting means of each flexible strip are mounted on different templates.

12. The apparatus of claim 11 wherein both templates are removable, making it possible to modify the curved profile by replacing the templates with templates of different curvature.

13. The apparatus of claim 11 wherein each strip is a chain whose various links are hinged on one another, each link being provided with flanges to which are fastened the rotating elements.

14. The apparatus of claim 1 further comprising a second template having a curved surface wherein the interconnecting means comprises two flexible longitudinal strips of mounting means that mount opposite sides of the moving means, said strips being mounted on different templates.

15. The apparatus of claim 14 wherein both templates are removable, making it possible to modify the curved profile by replacing the templates with templates of different curvature.

* * * * *